United States Patent [19]

Smith

[11] Patent Number: 5,261,201

[45] Date of Patent: Nov. 16, 1993

[54] PREFABRICATED CURVED HANDRAIL STRUCTURE AND CONNECTION METHODS

[76] Inventor: Lynn H. Smith, Rte. 1, Box 110, Gunter, Tex. 75058

[21] Appl. No.: 773,227

[22] Filed: Oct. 9, 1991

[51] Int. Cl.⁵ .................................... E04F 11/00
[52] U.S. Cl. ............................. 52/184; 403/8; 403/10; 403/6; 256/69
[58] Field of Search .................... 52/184, 186–187; 403/6, 7, 8, 10, 402; 256/65, 69; 403/258, 264; 256/59

[56] References Cited

U.S. PATENT DOCUMENTS

| | | | |
|---|---|---|---|
| 1,136,811 | 4/1915 | Kasanszky et al. | 403/8 |
| 3,596,880 | 8/1971 | Greenberg | 256/59 X |
| 4,027,855 | 6/1977 | Lauzier | 256/59 X |
| 4,944,627 | 7/1990 | Durney | 403/8 |
| 4,981,388 | 1/1991 | Becken | 403/258 |

FOREIGN PATENT DOCUMENTS

| | | | |
|---|---|---|---|
| 648459 | 11/1962 | Italy | 403/402 |
| 2147022 | 5/1985 | United Kingdom | 52/184 |
| 2235515 | 3/1991 | United Kingdom | 403/8 |

Primary Examiner—Carl D. Friedman
Assistant Examiner—Beth A. Aubrey
Attorney, Agent, or Firm—Hubbard, Thurman, Tucker & Harris

[57] ABSTRACT

Prefabricated handrail fittings are disclosed which contain preformed internal slots which accept simple fasteners for quickly making mitered and butt joints without hand working in the field. A plurality of interconnected slots are arranged internally along a longitudinal axis to provide fittings which are adjustable in length with only a simple transverse saw cut and which adjustably cover the entire range of angular inclination of an inclined handrail to which the fittings may be joined. A single angular fitting can be used to make either left or right turning connections between an uprising easing section and a post. A universal uprising easing is provided. Short extensions can be connected to surfaces while working from upper side without hand working.

31 Claims, 6 Drawing Sheets

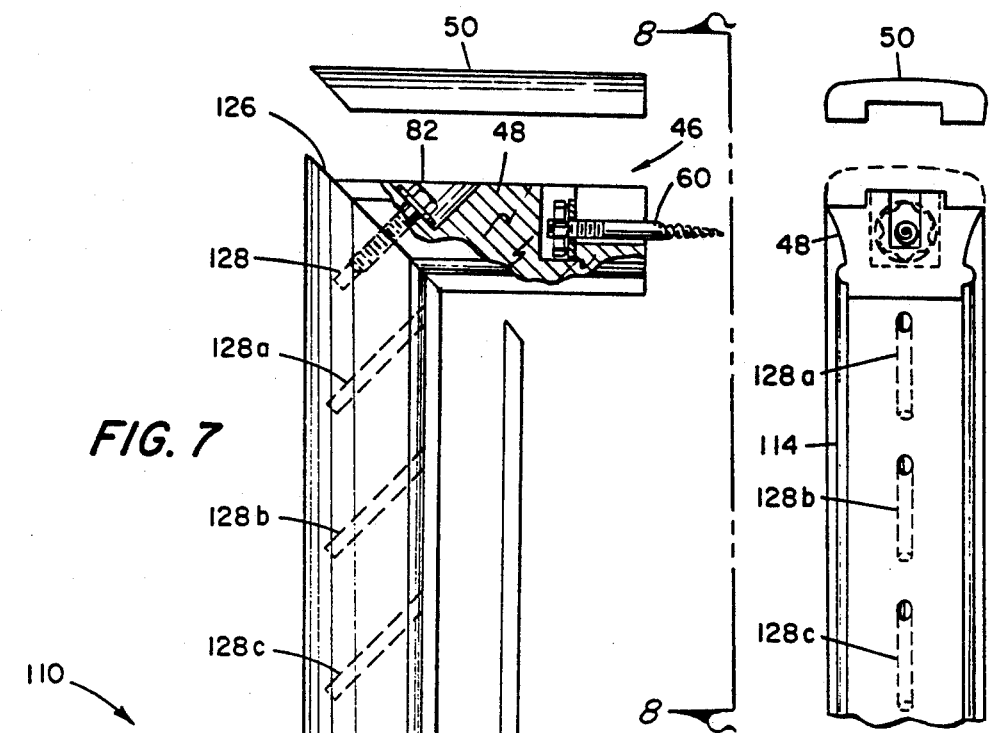
FIG. 7
FIG. 8
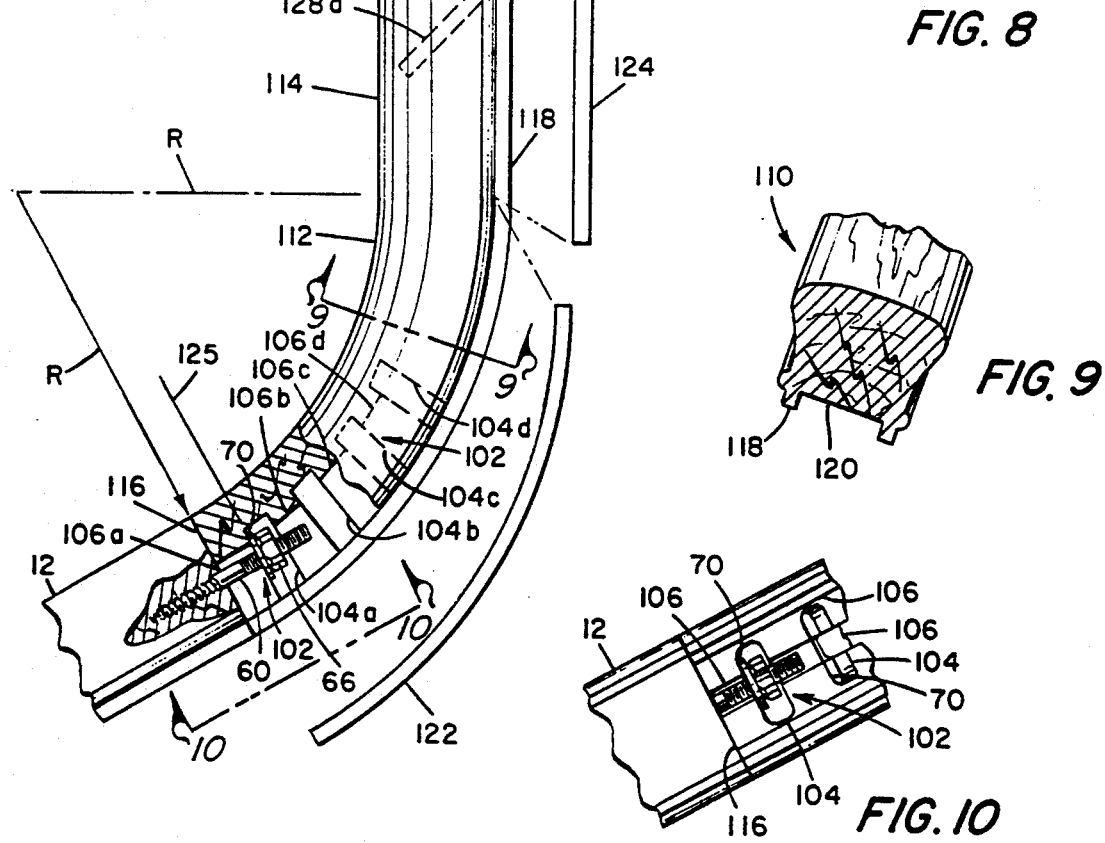
FIG. 9
FIG. 10

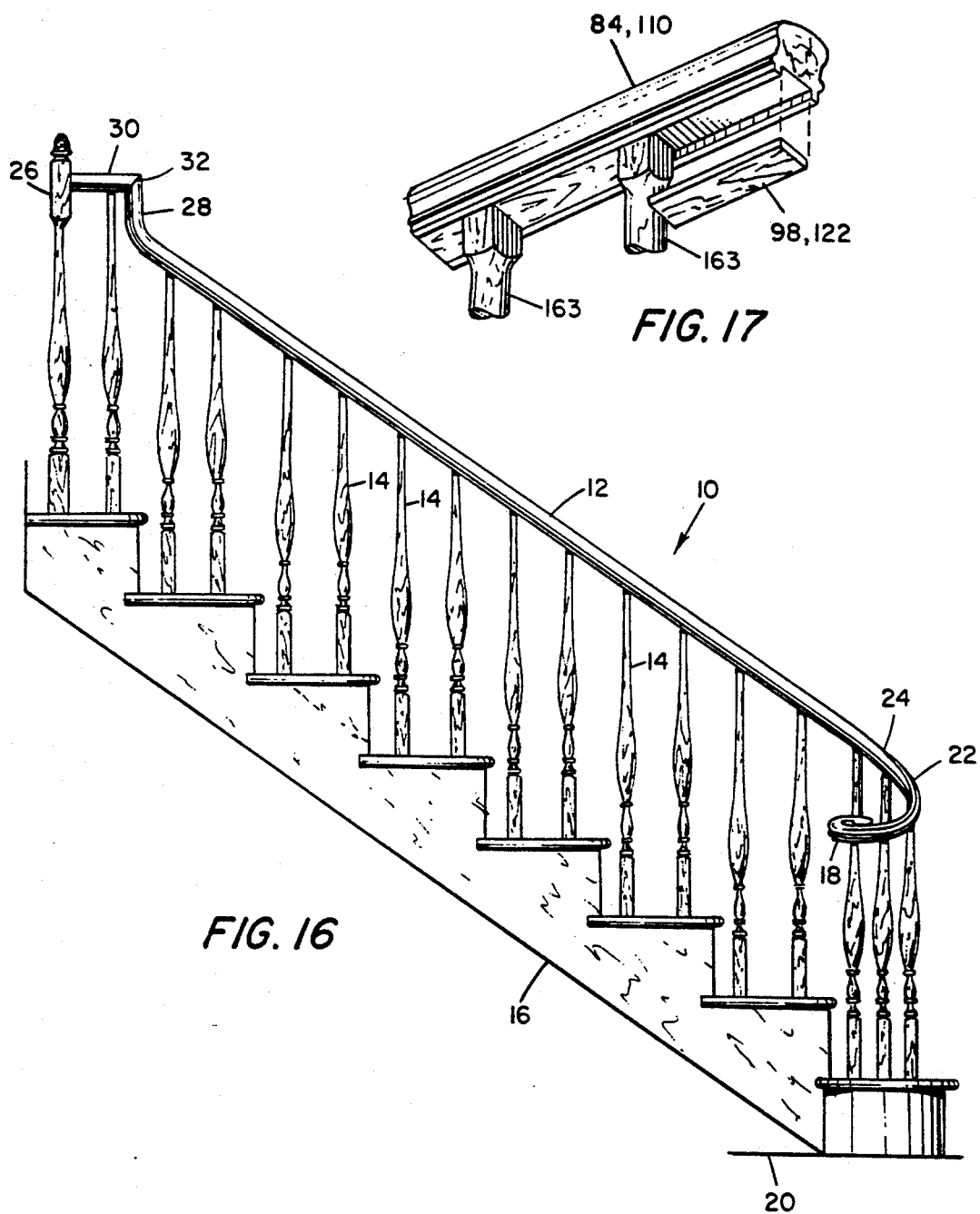

PREFABRICATED CURVED HANDRAIL STRUCTURE AND CONNECTION METHODS

BACKGROUND OF THE INVENTION

1. Field of the Invention

The invention relates to handrail fittings and transition joints for interconnecting curved stairway handrail elements.

2. Description of the Prior Art

Spiral staircases are generally custom built because each staircase has to fit within greatly differing available spaces, transcend differing heights, and most importantly, be aesthetically pleasing. Historically, such stairways have been built around the most majestic use of curves. The designer has a lot of flexibility in using combinations of various curves and straight sections, positioning of landings, the use of volutes and other elements of the handrail. Custom staircase handrails are massive structures most frequently made in hard wood. Standard fittings are available to form transitions between the continuous handrail line which climbs the stairway. They have the shape of the handrail, but they must be cut and worked in the field in order to form joints where the fittings are interconnected with the handrail elements. Since the fasteners must be hidden, extension blocks connecting uprisings to newel posts are conventionally worked from the bottom side to avoid disturbing the more visible upper surface of the bannister. Making connections in hard wood from the bottom side, often in tight spaces, is a very labor intensive and difficult task. In spite of the best efforts, misalignment and incompletely hidden joints which detract from the aesthetic appearance is the rule rather than the exception.

The term "fittings" is used in the industry to denote the parts used at the end of a given run of handrail to connect one handrail to another at turns, pitch changes, landings, etc. Fittings are also often used to artfully start handrail systems, cap dowel top newel posts, connect rails of differing altitudes in a given run and provide rail terminations. The term "fitting" as used in the plumbing profession is not unlike how it is used in the stair handrailing profession, that is, the fittings are used at the ends of pipe to make junctions and interconnections between them. Years ago handrail fittings were custom and often hand made for each individual stair (in often less than ideal circumstances). Some time later, conditions common to all stairs where fittings were being used were analyzed by stair materials manufacturers in an attempt to standardize, mass produce and distribute as inventoriable items to the stair building consumer. Many of these fittings are an assemblage of small components to solve for a given condition on a stair. These fitting assemblies as currently offered do save much time at the construction site and have been well received in the marked but do have many drawbacks.

The small components used to assemble large fittings have too many joints that break visual continuity through mismatching colors and grain patterns. The many joints are also unsightly because they are often conventionally made using parallel spaced apart saw cuts in the underside of two adjoining pieces and steel clips driven into the saw cuts are exposed to view on the underside of the fitting joint and must then be filled.

The conventional fittings are offered preassembled in only a standard group of sizes which do not accurately fit the majority of stairs and in the press of time are often installed improperly rather than being rebuilt at the job to correctly fit the application. This is due, in part, to the fact that stair casements are often constructed without regard to the design limitations of current standard fittings that must be made to conform to the stair at the time the handrail is installed. The problem is compounded by changing building codes which require certain handrail height, for example, that the standard fittings do not accommodate.

Fittings are currently designed to fit only one position on the stair, therefore requiring a large variety of sizes to be stocked, much of which gathers dust or must be sent for, causing delays at the job site. Due to the large number of parts required under the present system to complete a given stairway, a high degree of product knowledge is required to sell or purchase them correctly. This often leads to costly errors and delay at the job site.

The fittings are not prepared at the factory for quick assembly to connecting newels or handrail at the job site, but rather, require a good deal of time and skill to be properly laid out, hand drilled, bolted up and worked in accurately. Even a small misalignment of the parts creates an objectionable appearance.

It would be highly desirable to provide boxed fittings which are prefabricated at the factory site to require no more than simple straight saw cuts which can be accurately made in the field. It would also be desirable to produce fewer fittings which are easily altered in the field to produce left or right connections or be adjusted with simple saw cuts to accommodate different distances and angular connections to reduce inventory.

SUMMARY OF THE INVENTION

The invention provides a fewer number of prefabricated universal fittings which have precisely located built in connection means which form more precise joints more quickly and easily than do conventional fittings and connection methods. Extension blocks are provided which make it possible to interconnect with a newel post, or other cooperating facing surface, for example, by working from the upper side without having to hand work the hard wood to make the joints.

An improved extension block or interconnection between a newel post or other cooperating facing surface and an uprising handrail section has a squared off end and a mitered end and is separable into a lower body portion and a complimentary cap portion. The body portion and the cap portion have complementary facing surfaces and closely fit together. By removal of the cap portion it is possible to work from the upper side in order to make connections. This is an important advantage because the extension blocks may be used to connect a vertical uprising to a newel post, especially at a landing, and only a very small working distance is available between the two parts to be joined. The improved fitting has prefabricated fastener openings including a bolt receiving longitudinal groove intersecting at transverse slot and connecting with the central portion of the transverse face to receive the body portion of a bolt when a headed portion or nut is received in the transverse slot. The groove is narrower than the slot to form bolting surfaces on either side of the groove at the intersection of the groove and slot. A lag bolt extending from the post or other cooperating facing surface to which the extension block is to be connected has a perpendicularly extending lag bolt which has machine threads on the extending portion to receive an adjustable fastening head. To connect the extension the open top of the lower body portion is raised up to receive the bolt like fastener with the body portion in the groove, the adjustable portion being received in the slot and adjusted from the upper side to tighten the extension fitting to the post.

The opposite mitered end contains a centrically located countersunk fastener opening precisely located to receive a fastener extending from a cooperating facing surface of another handrail part. Alternately, a lag bolt can be employed with its threaded portion normal to the mitered surface and tightened into the connecting piece to form a right angle joint. When the complementary cap portion is installed, leaving unobtrusive seams along the direction of the grain, all fasteners and connectors are hidden from view. The groove and transverse slot will be referred to as a T shaped slot for receiving a bolt like connector or fastener. These fastening means are employed in other fittings and transition joints.

The invention includes a prefabricated angled handrail fitting having a lower body portion and an upper cap portion which permit working from the upper side and additionally can be altered with a simple transverse saw cut to make either a right or a left turning connection between a complementary uprising section and a post or other cooperating facing surface. The angled handrail fitting is shaped like a handrail with an arcuate mid-section from which angled legs extend. The angled legs are straight end sections angled from each other and mitered, usually at a 45 degree angle, so that either end may be used as a connection with the mitered end of a vertically disposed uprising.

Each of the mitered end sections of the lower body portion of the angled fitting has a centric countersunk opening for receiving an embedded fastener passing through the mitered facing surface at a surface at a right angle thereto and into the corresponding face of a mitered uprising. A slotted connection means in the lower body portion of each end section is located inwardly from the innermost edge of the mitered terminating face for receiving a bolt like connector for connecting one of the left or right turning end sections against a post or other cooperating facing surface when one of the left or right turning end sections is cut off through a portion of the slotted connection perpendicular to the longitudinal axis of a given end section. It permits either of the end sections to receive a bolt like connector as in the previously described handrail extension to form a butt joint against, for example, a post. The only hand working required is a simple severing of the outer end portion of one of the end sections by means of a block cut. Once the connections are made, the complementary cap portion is replaced so that all connection means are hidden.

In an alternate arrangement, one or both of the left or right turning end sections has a plurality of interconnected slotted connection means aligned along the longitudinal axis and arranged so that the mitered face of the end section can be cut off at a plurality of locations to expose any one of the plurality of interconnected slotted connection means for use with a bolt like connector to make a connection with a post or other cooperating facing surface and provide a choice of arm length sections without additional hand working. The plurality of slotted interconnection means may comprise T shaped intersecting slots having a transverse head portion and a longitudinal stem portion, the head portion of one slot opening into the stem portion of the next slot. This embodiment provides great versatility by providing a single angled fitting which can effectively provide an almost infinitely variable range of running distance in the legs to accommodate a custom handrail installation.

In a further embodiment, a prefabricated universal fitting provides versatility for connecting to a handrail having a range of different inclination corresponding to various stairway pitch angles within the customary range and carrying the curve of the handrail smoothly into an upright easing which may be connected to a continuation of the handrail. In the preferred embodiment, both the curved lower end section of the universal fitting and the straight uprising portion may be adjustable by means of transverse saw cuts to accommodate different angularly oriented handrails at the curved end and different lengths of uprising at the straight end, all in one universal fitting. The underside of the curved portion has a plurality of interconnected slotted connection means aligned along its longitudinal axis for making a connection to an inclined handrail. The lower curved end section may be cut off to form a connecting face to make a tangential connection with an inclined handrail to expose one of the slotted connection means for use with a bolt like fastener extending from an inclined handrail to make a connection therebetween without the necessity for hand working. The underside of the universal fitting is grooved to accept a cover or filet which hides all connectors and slots from view in the completed installation. The interconnected slotted connector means may comprise T shaped intersecting slots having a transverse head portion and longitudinal stem portion, the head portion of one slot opening into the stem portion of the next slot. The head portion of the slot may be radially oriented along the curve or angled slightly from radial orientation to form a bolting surface which is parallel to the cut off transverse end face which exposes the slot portion of the T shaped slot.

The straight upper portion of the universal fitting may include a mitered end face having a generally normally oriented predrilled opening to receive the embedded fastener of an extension block as previously described. The underside of the upper straight section contains a plurality of such centrally located predrilled openings spaced apart along the longitudinal axis and angled to be normal to the mitered end face of any one of a plurality of cuts that may be made, spaced from the mitered end face to accommodate a variety of uprising distances. A simple transverse cut will expose one of the plurality of predrilled openings to which a prefabricated extension block may be connected by means of a bolt like fastener. The cover portion of filet may also cover the predrilled openings so that in finished assembly they are not exposed to view.

In still another embodiment, a prefabricated transition fitting is designed for interconnecting a finishing element, such as a volute or turnout, to a variously inclined handrail within the customary range of stairway pitch angles. The transition fitting has a curved upper handrail body and an underside surface cut away along its length to form a channel like opening and a cover member to enclose said channel like opening in completed assembly. The undersurface having a plurality of interconnected slotted connection means aligned along its longitudinal axis for making a connection to the handrail end of a finishing element with the aid of a bolt like fastener at one end whereas the opposite end may be cut off to make a tangential connection with an inclined handrail of various inclinations by exposing one of the slotted connection means for use with a bolt like fastener extending into an inclined handrail so that the shaped handrail line is smoothly and continuously carried upwardly between a finishing element and an inclined handrail proper. The interconnected slotted connection means may comprise T shaped intersecting slots having a head portion and a longitudinal end portion aligned together as previously described. The channel like undersurface may be adapted to receive one or more square ended balusters with portions of the cover member cut to fit between. The fittings of the invention are entirely prefabricated in a controlled environment and require only simple saw cuts to achieve adjustability. The connection means are precisely located, more easily accessed for assembly, require no hand working and thus produce superior finished appearance with less skilled labor. The ordering of fittings by the builder from plans, a difficult task, is less subject to error because the fittings of the invention are easily adjusted in the field so that less returns and reorders are required reducing delays in construction. The expensive inventory of the manufacturer, distributor and builder is significantly reduced as compared to conventional fittings which are of a fixed size and expensive to alter, particularly if the stairway does not quite conform to the plan.

BRIEF DESCRIPTION OF THE DRAWINGS

FIG. 7 is a side elevation of a prefabricated universal uprising and extension block which is adaptable to connect with a variety of handrail inclinations and adjustable in height;

FIG. 8 is a partially exploded underside elevation showing the end of the extension block cap member and a portion of the uprising;

FIG. 9 is a perspective view showing the grooved undersurface of the universal fitting of FIG. 7;

FIG. 10 is a cutaway showing the underside of the connection between an inclined handrail and the curved lower end of the fitting of FIG. 7;

FIG. 13 is an elevation view of the same end as FIG. 12 which is not severed and has a fastener showing through;

FIG. 16 is a side elevation of a portion of a curved stairway and handrail showing how the fittings cooperate with the handrail and finishing elements;

FIG. 17 is an exploded perspective view showing how square ended balusters may be captured in the grooved underside of a fitting and secured by sections of cover member.

DETAILED DESCRIPTION OF THE PREFERRED EMBODIMENT

Figure 1:
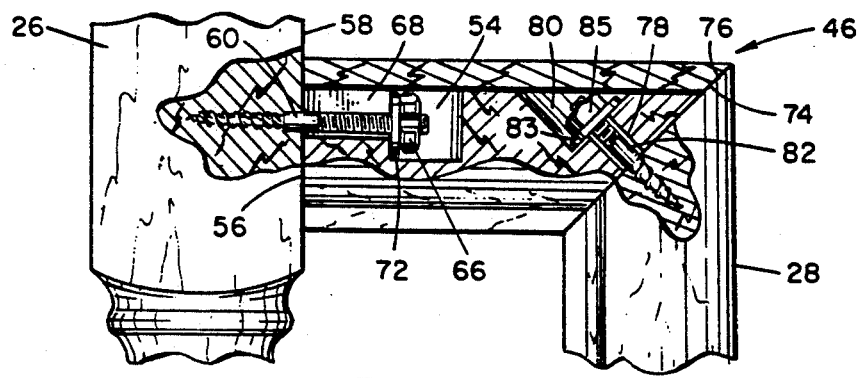
FIG. 1 is a cutaway elevation of a prefabricated extension block connected to a newel post in the upper end of an uprising handrail section.

In the description that follows, like parts will be identified with the same reference numerals insofar as possible. In FIG. 16 is seen a side view of the completed handrail assembly 10 having an inclined handrail 12 carried by balusters 14 along a stairway 16 at a typical stairway pitch. The stairway 16 and handrail 12 may be curved as well as angulated, in a spiral form or in a combination of straight and curved sections. A volute 18 is used at the entrance of the stairway, rising from floor 20. The volute is referred to as a finishing element. It is necessary to have a transition fitting 22 between the end of the volute 18 and the handrail 12 to carry the majestic curved handrail upwardly in a smooth continuous curve. The transition fitting 22 is connected with a handrail 12 at the transverse end face 24.

The handrail is carried upwardly to the newel post 26 through an uprising 28 and an extension block 30. The uprising 28 is connected at a joint 32 with the extension 30. It is often necessary that the extension 30 be formed as an angled fitting where an angled end portion would run perpendicular to the paper where its outer end would be connected to the upper portion of the newel post. The invention provides prefabricated fittings which do not require hand working in the field and which have precise connection means for quickly and economically making joints with other portions of handrail, newel posts or finishing elements.

Figure 3:
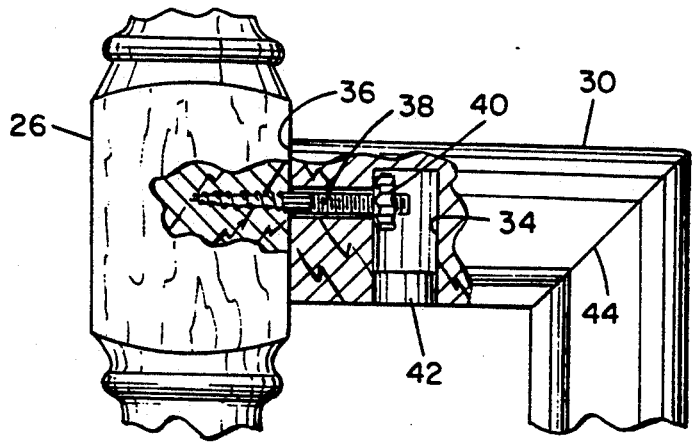
FIG. 3 is a cutaway elevation view of a prior art method of connecting an extension block to a newel post.
Figure 4:
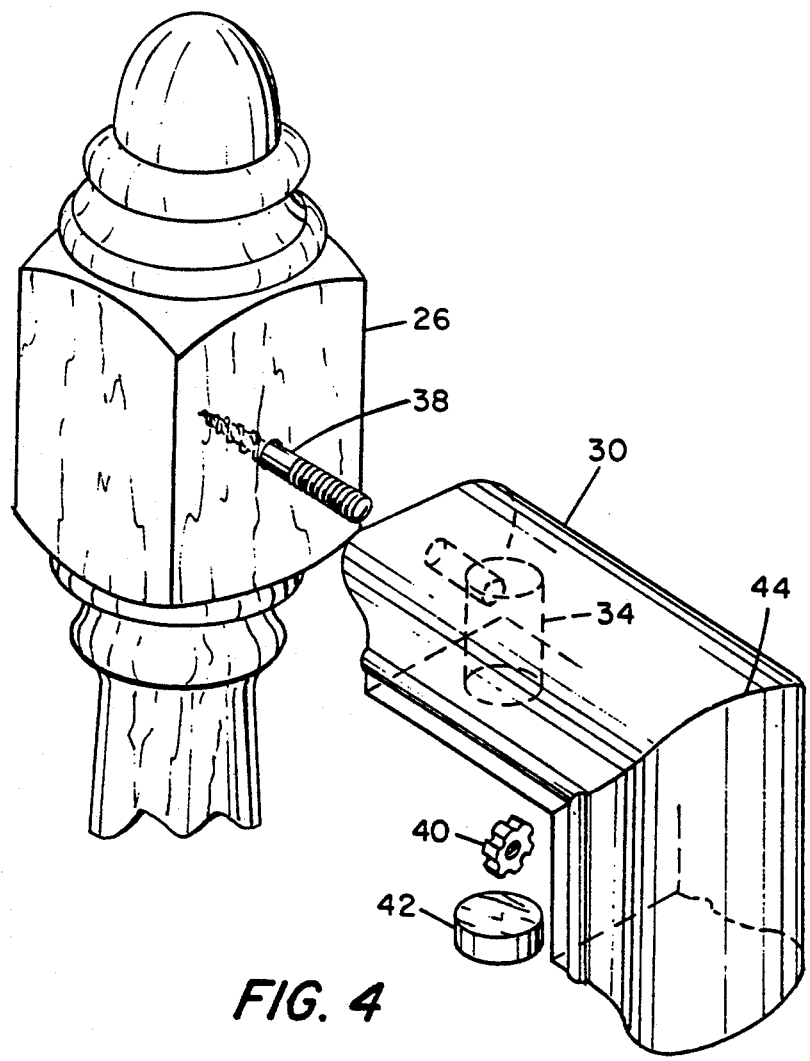
FIG. 4 is an exploded perspective view of the prior art extension block and connection to the newel post illustrated in FIG. 3.

The conventional prior art method of connecting an extension to a newel post is shown in FIGS. 3 and 4. The extensions are often short as in FIG. 3 which makes it difficult to work from the underside in order to avoid disturbing the handrail appearance. Once extension 30 is cut to length, an opening 34 is bored into the underside and the end face 36 is drilled into the bore 34 to accept a bolt 38 having a threaded end extending into the bore. A nut like headed portion also seen in FIG. 4 is then used to make the connection. It is usually necessary to hand work the bore 34 to form a flat surface for the nut like head 40 to rest against in order to have a secure joint. This is an expensive, time-consuming and difficult task, especially working from the underside in a confined area where it is difficult to see. It is then necessary to manipulate the nut like head against the force of gravity to get it threaded on the end of the bolt 36. Once this difficult task is completed, the opening of the bore is plugged by a tapered wooden plug 42. As was noted in the background of the invention, the joint 44 must be made in the field prior to making the connection shown in FIGS. 3 and 4, and the difficulties therein described are encountered. All such hand working in the field is eliminated by the present invention which requires only the use of straight saw cuts requiring less skill in producing a more attractive finished product which requires less finishing work.

Figure 2:
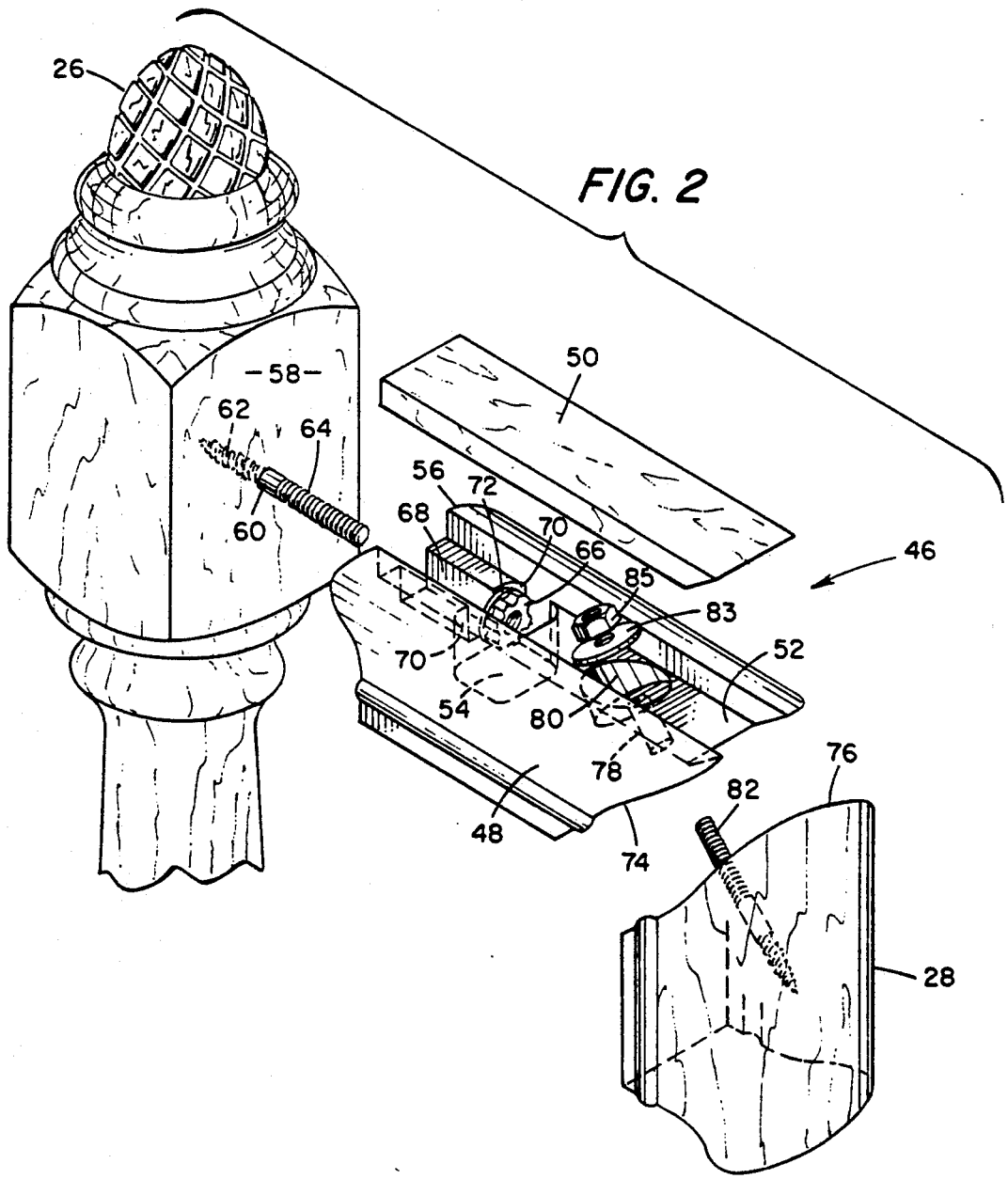
FIG. 2 is an exploded perspective view of the extension block of FIG. 1.

An improved handrail extension, sometimes called an extension block, of the present invention is shown in FIGS. 1 and 2. The improved extension is used to connect the newel post 26 with an uprising 28. The improved extension is generally designated by the reference numeral 46. As seen in FIG. 2, it is separable into a lower body portion 48 and a complementary cap portion 50 which is removable and which fit together along longitudinal surface 52. Extension 42 is a shaped fitting having the handrail shape. An imaginary longitudinal axis which may be visualized as parallel to the running length of the extension 46.

The lower body portion has a transverse slot 54 spaced from a transverse first end 56. Transverse first end 56 is to be connected to a cooperating facing surface 58 such as on newel post 26. Centered in the face 58 is a bolt like fastener 60 having lag threads 62 imbedded in the post on one end and machine threads 64 on the opposite end extending from the post. Transverse slot 54 is spaced from the face of the first end 56 and deep enough to receive the head end 66, which is a nut like fastener with machine threads for the bolt 60. A longitudinal groove 68 is preformed in the lower body portion for receiving the body portion of the bolt 60, connecting with the central portion of face 56 and intersecting the transverse slot 54 to provide bolting surfaces 70 on either side of the groove 68. Groove 68 is narrower than the transverse slot. The bolting surfaces 70 are formed at the intersection between the groove 68 and the transverse slot 54.

The connection is made at the newel post by bringing the face 56 up against the face 58 with the extending portion of bolt 60 spaced in groove 68 with some starting threads exposed in the slot 54 and the nut like headed end 66 is conveniently worked from the top to engage thread 64 to bring the nut 66 against the bolting surfaces 70 as indicated in FIG. 1. The operation can be performed with the nut 66 already in place on the bolt. A washer 72 may be used to provide a flatter bearing surface. When the cap portion 58 is replaced after tightening the bolt like fastener, all the slots and fasteners are hidden from view.

Extension 46 further includes a second end face which is an angled transverse mitered face 74 that is continued by a end portion of cap 50. Uprising 28 has a cooperating angled mitered surface, usually at 45 degrees, to make an angled joint. The lower body portion of the extension has a centrally located countersunk fastener opening 78, the countersunk portion being identified as reference numeral 80. Centric countersunk fastener opening 78 is angled to receive a bolt like fastener 82 on a line normal to the surfaces 74, 76 which is fastened to an opening in the central portion of face 76 of uprising 28. By placing the facing surfaces 74, 76 together with bolt 82 extending through countersunk opening 78, a washer 83 and a nut 85 may be threaded onto bolt 82 to accurately secure extension 46 to uprising 28. If the uprising of FIG. 7 is utilized, a precisely located predrilled opening is available and the joint is formed entirely from prefabricated parts with no hand working in the field.

The extension 46 may be extended in the direction of the newel post 26 to include a plurality of the same transverse slots spaced at intervals along the longitudinal axis from the face of the first end of the fitting and the bolt receiving longitudinal groove being extended to intersect each of the transverse slots and form bolting surfaces at each intersection of each transverse slot. Then the handrail fitting can be cut off transversely at a plurality of locations along its end portion to create a facing surface 56 at a plurality of locations to utilize one of the bolting surfaces of a given transverse slot to secure the fitting to the post or other cooperating facing surface and provide a range of adjustment in the lengthened extension fitting without additional hand working beyond a simple transverse cut. The sequence of transverse slots and intersecting grooves is similar to that shown in FIG. 6 except that they are on the opposite side here as a continuation of the slots 54 and 68 in a straight line.

Figure 5:
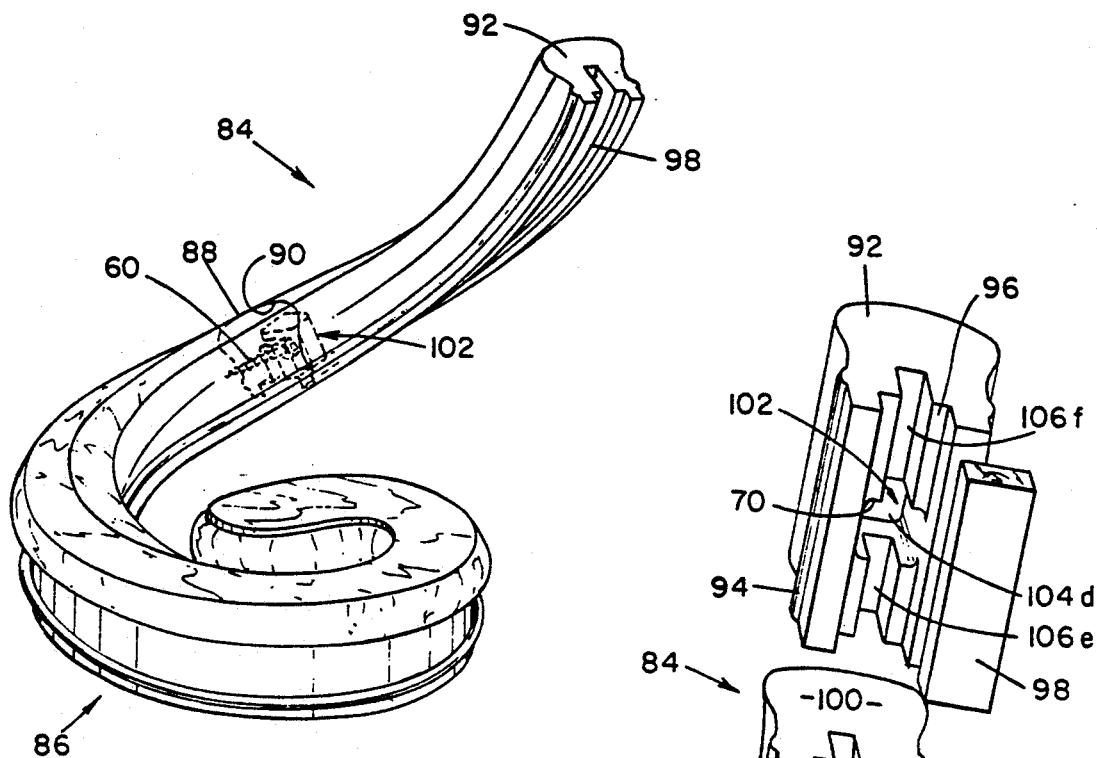
FIG. 5 is a perspective view of a volute having a handrail shaped end which is connected by the improved connection to a prefabricated transition fitting which is universally adaptable to a variety of inclined handrail.
Figure 6:
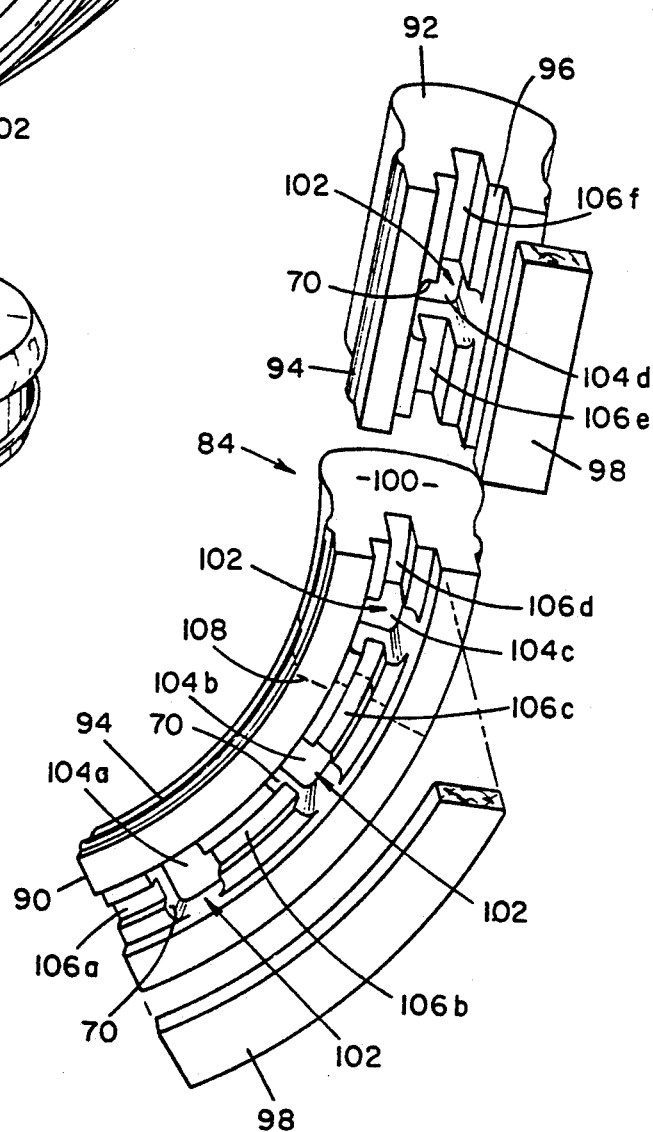
FIG. 6 is a bottom perspective view of the prefabricated transition fitting.

In FIGS. 5 and 6 is a prefabricated transition fitting 84 for interconnecting a finishing element such as volute 86 in FIG. 5 having a shaped handrail end 88 with a variously inclined handrail such as handrail 12 in FIG. 16. Prefabricated transition fitting 84 is used in place of transition fitting 22 in FIG. 16.

The transition fitting 84 has opposite first end face 90 and second end face 92 and a longitudinal axis of symmetry along its length. In describing these fittings the term "longitudinal axis" is used in its usual sense meaning an imaginary axis which runs along the long dimension of the part and follows the curve where the part is curved. It may be regarded as a center line along the length of the part. Transition fitting 84 is a shaped rail fitting having an upper handrail body portion 94 with the underside cut away to form a channel like opening 96 that includes a complementary cover member 98 to close the channel like opening in a completed assembly.

The transition fitting is curved along an arc of sufficient length to provide a tangent connection with one of its ends to an inclined handrail over a range of handrail inclinations when the handrail fitting is transversely cut off to expose a connecting face and the fitting is oriented with the opposite end face abutting the handrail end 88 of a finishing element such as element 86. FIG. 6 shows the fitting 84 has been severed to form a connecting face 100. It will be seen from FIG. 5 that the fitting 84 is angled at an increasing radius to accommodate even a steeply angulated handrail inclination if its full length is used. It will be seen from FIG. 16, that the transition denominated 22 must form a tangential connection with the upwardly inclined handrail 12 in a smooth transition joint.

In FIG. 6 the channel like undersurface of the transition fitting has a plurality of interconnected slotted connection means designated generally 102, said interconnected slotted connection means being aligned along the longitudinal axis for making a connection of one of said first or second fitting end faces to the end of a finishing element with the aid of a bolt like fastener. This is seen in FIG. 5 where the slotted connection means 102 closest to the end 90 is connected to the handrail end 88 of volute 86 by means of bolt like fastener 60 the same type as described in the previous embodiment. Volute 86 has a predrilled centered opening to receive the lag bolt end of fastener 60 with the machine bolt end extending into slotted connection means 102 so that a large diameter headed nut like portion can be threaded on to secure the parts together as indicated. All the slotted connection means and fasteners are hidden from view when the cover member 98 is used to close the opening in the under surface of fitting 84.

More particularly, the slotted interconnection means 102 comprise T shaped intersecting slots having a transverse head portion 104a-d spaced apart along the longitudinal axis, inwardly spaced from the opposite end faces of the fitting. The T shaped intersecting slots have a longitudinal stem portion 106a-f which may be thought of as a continuous groove spaced along the underside of the body portion 94 parallel to the longitudinal axis of the fitting 84 and interrupted at spaced intervals by the transverse head portions 104a-d. The head portion of one slot opens into the stem portion of the next slot.

The transverse head portion 104 is preferably deeper than the longitudinal stem portion 106 so that the stem portion 106 can support the body portion of the bolt like connector and the head portion will accommodate the nut like connector with sufficient room so that it can be rotated without interference. The longitudinal stem portions also provide a means for precisely locating the end 90 with respect to the end 88, for example, because the opening for bolt 60 is located to cause the edges of the fitting to match the edges of the end of the volute 86. A similar connection is made between the connecting face 100 and the transversely cut off end face of a handrail 12 which is joined to the end face 100 in a similar manner to the way the opposite end is connected to the end of the volute or other finishing element. It is essentially the same connection as is seen in FIG. 1 except that the openings for the bolt like fastener are reversed and located in the under surface of the fitting 84. It is seen that bolting surfaces 70 are established at the intersection of the longitudinal stem portion 106a-f with transverse head portion 104a-d in order to secure the widened portion of a fastener or a washer.

It is also seen that the fitting 84 can be cut off at a plurality of selected locations, such as the selected location indicated by the dotted line 108 so that the transition joint will have the proper angle to smoothly continue the flow of the lines of the handrail which will be inclined according to the pitch of the particular stairway involved. Spacing along the longitudinal axis of the individual headed portions 104a-d will be selected to provide a greater or lesser number of bolting surfaces along the length. In the event insufficient wood remains between a transversely cut off end face and the first available headed portion of a T shaped slot, the bolt-like connector 60 can be partly backed out of the piece to be connected or a longer bolt used to extend into the next available transverse slot, and in this way the selected connection possibilities are almost infinite.

In FIGS. 7-10 is a prefabricated universal fitting generally designated by the reference numeral 110. It is adapted for interconnecting tangently with a length of handrail having a range a different inclination corresponding to varying stairway pitch angles and carrying the curve smoothly into an upright easing or uprising which may be connected to a continuation of the handrail. The handrail fitting has an imaginary central longitudinal axis along its cross section running along its length and following the curve. Fitting 110 has a curved lower section 112 and an upper straight section 114. The lower curved section 112 is curved along an arc of sufficient length to provide a tangent connection to a handrail for a range of handrail inclination when the curved portion of the fitting is transversely cut to expose a connecting face. In FIG. 7 a connecting face 116 is tangently connected to the end of a handrail 12.

The lower curved end section has a plurality of interconnected slotted connection means 102 aligned along the longitudinal axis as indicated in FIGS. 7 and 10. The plurality of slotted interconnection means comprise T shaped intersecting slots perhaps best seen in FIG. 10 having a transverse head portion 104a-d and a longitudinal stem portion 106a-d, the head portion of one slot opening into the stem portion of the next slot. Bolting surfaces 70 are formed at the intersection of the head and stem, against which a large diameter portion of a bolt like fastener can be tightened when the end face of the lower curved section is cut off to expose the stem of one of the plurality of T shaped slots. It can be seen that the lower curved end section 112 can be cut off at a plurality of selected locations transversely to accept and make a joint with the end of a handrail 12 by means of a bolt like connector or fastener 60. Bolt 60 is centrally lagged into the end face of handrail 12 with its body portion extending along a groove or stem portion 106 and a nut like fastener, which may be employed with a washer, is located in one of the transverse slots at the cut off end and tightened against the bolting surfaces 70.

The underside 118, as best seen in FIG. 9, is grooved with a groove 120 to accept one or more complementary filets 122, 124 which may be used to inconspicuously cover the interconnected slotted connection means and any bolt like fasteners employed therein. By separating the filet 122 to individual pieces the groove 120 conveniently accepts the mitered square end of a baluster 163 in the manner disclosed in FIG. 17. FIG. 17 is a somewhat schematic representation in that although it is shown as straight, it represents the curved fittings 84, 110 which can accept the mitered end of angled balusters in the grooved underside 96, 120. Pieces of the filet may be installed on opposite sides of a baluster which may be used to partially support the underside of the curved end section, if desired.

The lower curved end section may be curved along the arc of a radius R and it is preferred that the transverse T shaped slots 104a-d be cut at a slight angle to the radial orientation so that they form bolting surfaces parallel to the radial orientation of the transverse cut off end face at the end of the stem of a given slot. For example, in FIG. 7, the line 125 represents the orientation of the first slot 104a at the location of its bolting surfaces 70. It will be noted that line 125 lies parallel, in this case, to the radial cut off end face 116 which in FIG. 7 lies on the radius R. This has the advantage of providing a more solid bearing surface for the nut 66 when the bolt 60 is normal to the interface 116 between handrail 12 and the end face 116 of the curved end section. Each of the succeeding transverse head portions are similarly slightly inclined off the radial orientation so that they too will provide a parallel bolting surface when the curved end section is cut off transversely to form a radial face at the end of the longitudinal stem of a given T shaped slot.

The upper straight section 114 of universal fitting 110 terminates in a mitered end face 126 for making an angled connection with a shaped handrail extention 46 as described in FIGS. 1 and 2. The handrail extension may be connected thereto to form a continuation of the handrail profile. End face 126 is predrilled with a centrally located opening 128 normal to the mitered end face for accepting an embedded bolt like fastener 82. In addition, the upright end section 114 contains a plurality of centrally located predrilled openings 128a–d spaced apart along the longitudinal axis and angled to be parallel to the opening 128 and thus normal to the mitered end face 126. Some of the plurality of predrilled openings 128a–c are seen in the view of FIG. 8. Thus it is seen that the straight uprising 114 may be adjusted in length by making a plurality of mitered cuts at selected longitudinal locations parallel to the cut 126 through one of the predrilled openings 128a–d for use in making a connection with a shaped handrail extension 46. Although the predrilled openings do not go through to the opposite surface, they are deep enough to accommodate a variety of selected positions for the transverse mitered cut to accept an embedded lag bolt 82 which requires only enough threaded engagement to make a secure connection. The spacing of the predrilled openings 128a–d may be selected to provide an almost infinitely variable length without requiring the drilling of an additional hole to connect an extention, such as extension 46. Once such a connection is made, the filet 124 and cap 50 will cover all predrilled openings and fastening connections and hide them from view.

In FIGS. 11 through 15 is disclosed an improved prefabricated angled handrail fitting 130 which when horizontally oriented may be used alternately as a left turning or right turning connection between a complementary uprising handrail section and a post or other cooperating facing surface. The fitting has a lower body portion 132 and a complementary cap portion 134. Cap 134 may have a cutout section 136 running along its longitudinal axis and body portion 132 may have a corresponding raised portion running along the longitudinal axis and curved around through an arcuate mid-section 140. The cut out section and raised portion could be reversed in the body and cap of course. The longitudinal axis may be thought of as an imaginary center line running uniformly around the body of the angled fitting.

Figure 11:
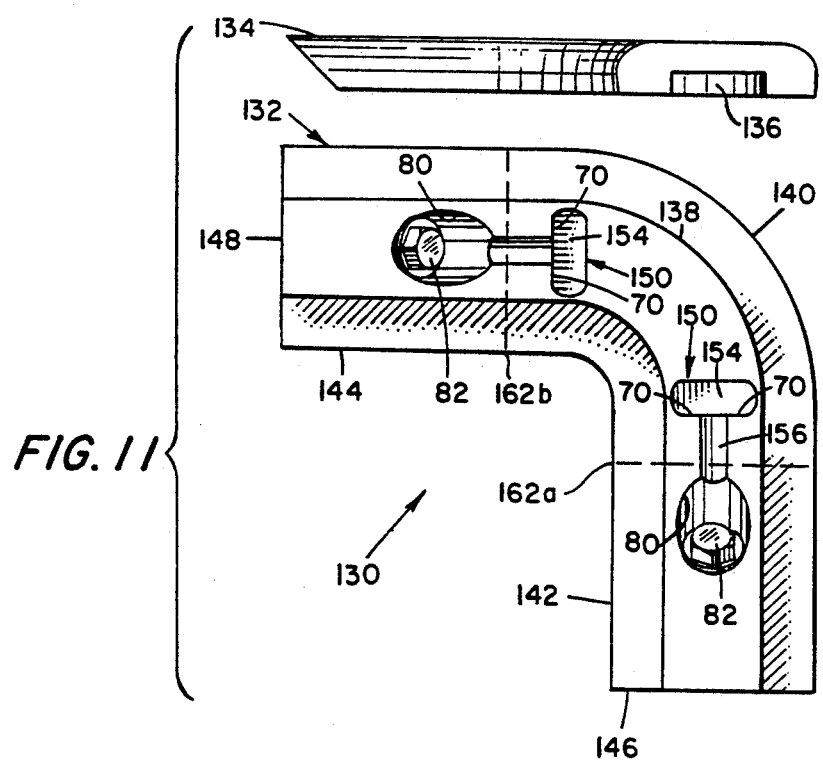
FIG. 11 is a partially exploded plan view of an angled fitting that can be used for left or right connection with a separable cap member seen viewed at eye level.
Figure 13:
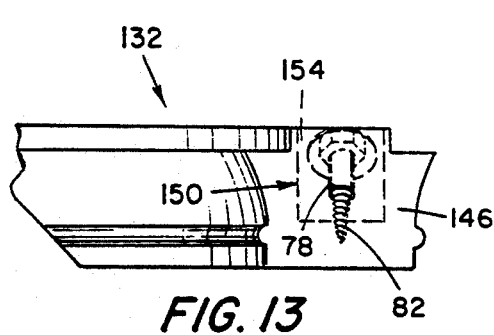

The angled fitting is shaped like an elbow, having extending from the arcuate mid-section an elongated left turning end section 142 and an elongated right turning end section 144 having a longitudinal axis, said left and right end sections extending from the mid-section and angled from each other, preferably though not necessarily, with the longitudinal axis of the respective end sections angled at 90 degrees to each other as in FIG. 11.

Each of the end sections 142, 144 terminate in a mitered facing surface, respectively, facing surfaces 146, 148. Surface 148 is better seen in FIG. 12, and both mitered facing surfaces are located and angled the same way. In the outer end portion of each end section is a means for receiving an embedded fastener comprising an angled, centric countersunk fastener opening 78 having a countersunk portion 80. Centric means it is centered between the side portions. Centric opening 78 passes through the terminating mitered facing surfaces 146, 148 angled normal thereto, for receiving a fastener, such as lag bolt 82, for connecting to the mitered face of an uprising easing, such as uprising 28 or 114.

Figure 12:
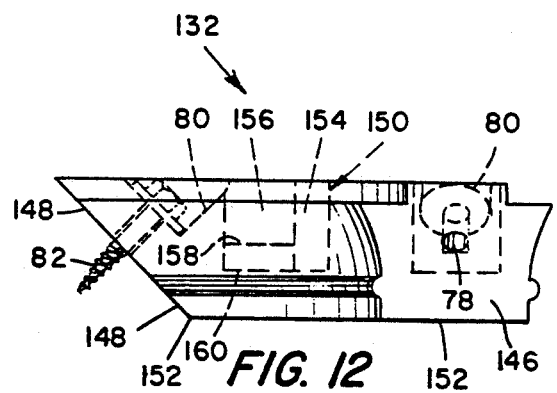
FIG. 12 is an end elevation view looking at one end of the angled fitting of FIG. 11, with the nearest bolt like fastener removed.

Each of the end sections have a slotted connection means located inwardly from the innermost edge 152 of the mitered end faces 148 and 146. Slotted connection means 150 is a T shaped slot having a transverse head portion 154 and a longitudinal stem portion 156. Stem portion 156 is a groove having a bottom surface 158 which is shallower in depth than the depth of the transverse slot 154. This provides a shelf for supporting and positioning the body portion of a bolt like fastener 60. Alternately, the longitudinal stem portion could have a depth 160 as indicated in FIG. 12.

Figure 15:
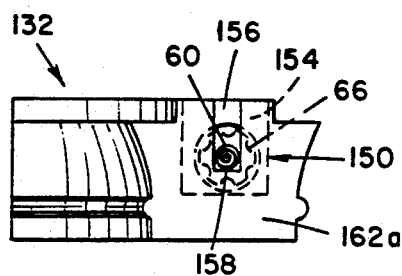
FIG. 15 is an end elevation view of the angle fitting of FIG. 11 showing a bolt like connector installed in a T shaped slot of one of the transversely cut off ends.
Figure 14:
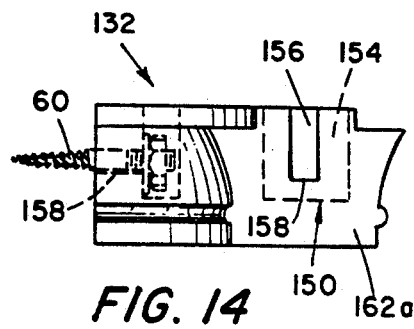
FIG. 14 is an end elevation view of the angled fitting of FIG. 11 in which both angled end sections are transversely severed to utilize a bolt like connector.

By transversely severing one of the left or right turning end sections at a cut line 162a, 162b through the end portion of the slotted connection perpendicular to the longitudinal axis, it is seen that one of the cut faces 162a, 162b can be secured to a post or other cooperating facing surface with the use of the slotted connection means 150 and a bolt like connector 60 in the manner shown in FIG. 1. FIG. 14 shows the cut surface 162a with the mitered end section having face 146 and the opening for the embedded fastener all removed. The longitudinal slot 156 becomes available to receive a bolt 60 for use in making the connection. In FIG. 15 is seen a bolt like connector 60 lying in the longitudinal slot in the bottom 158 of groove 156 with anut like connector 66 resting against the bolting surfaces 70 formed at the intersection of the T shaped transverse slot and the longitudinal stem portion. The angled end portion on the other end section may then be attached to an uprising in the manner indicated in FIG. 7 so that the same angled handrail fitting can be converted to make a left or right turning connection between an uprising at one end and a post at a severed other end by the simple expedient of making a saw cut as indicated along one of lines 162a, 162b.

It is also evident that the left and right turning end sections 142, 144 can be extended in a straight line in the longitudinal direction, the extended end section having a plurality of intersecting T shaped slots with intersecting heads and stems in the manner indicated in FIG. 6, or like those shown in the curved bottom portion of FIG. 7, except they would be running in a straight line. The outermost stem of the T shaped slot closest to the end of the extended arms 142, 144 would have the same centric countersunk fastener opening 78 in the lower body extending through and generally normal to a mitered terminating face at the end of the extended end section.

In the best mode it is contemplated that the fittings can be most economically produced using a computer controlled router which can be programmed to cut the necessary shapes, grooves and slots in an accurate repeatable manner. Three off-the-shelf software packages for producing numerical data and operating a numerical controlled routing machine are identified as 1) "ROUTER CIM" (computer integrated manufacturing), version 3.4, 2) "NC Polaris" version 3.2 or 4.0, and 3) "PC APT" version 3.2. "ROUTER CIM" and "NC Polaris", 3-axis programs, are available from GPM Technology, Inc., 1813 Fabyan Parkway, West Chicago, Ill. 60185. "PC APT", a 5-axis programming package is available from CAM-TEK Manufacturing Co., P. O. Box 820734, Ft. Worth, Tex. 76182. "ROUTER CIM" and "NC Programmer" are designed to work in concert with "AutoCad" version 11 to produce 3-axis numerical control (NC) data to control a "FANUC" Controller Model Series 15M. "PC APT" is a package that will produce 5-axis numerical data completely separate from "AutoCad", also to control a "FANUC" Controller Model Series 15M. Some of the less complex parts require only a 3-axis programming system while the more complex, compound curved fittings require a 5-axis system such as "PC APT". "FANUC" Controller 15M will control SHODA 6-axis NC router such as SHODA NC163-6220 which is contemplated to be a suitable way of routing the fittings.

Only 5 of the axes need to be used to form the most complex parts. It is believed that any appropriately controlled 4-axis numerical controlled router with a routing surface large enough to accommodate the fittings is useable. The router and controller referred to herein are also available from GPM Technology, Inc. Although the use of a numerical controlled router is the most accurate and economical, it is believed that with suitable conventional jigging and fixturing, hand operated routers and machine tools can be used to form the fittings.

What is claimed is:

1. An improved prefabricated angled handrail fitting which permits working from the upper side for use alternately when horizontally oriented as a left turning or right turning connection between a complementary uprising handrail section and a post or other cooperating facing surface, the handrail fitting comprising:

a shaped handrail fitting having an arcuate mid-section with left and right turning end sections having respective longitudinal axes and extending away from said mid-section at an angle to each other; each of said end sections terminating at a mitered facing surface angled to said respective longitudinal axis for connection to the cooperating facing surface of a shaped handrail uprising when said angled handrail fitting is horizontally oriented, said handrail fitting being separable into a lower body portion and a complementary cap portion;

the outer end portion of the lower body portion of the left and right turning end sections each having a means for receiving an embedded fastener passing through said terminating mitered facing surfaces for securing to the corresponding face of an uprising handrail;

a slotted connection means in each end section located inwardly from the innermost edge of the mitered terminating face of each end section for receiving a bolt like connector for connecting one of the left or right turning end sections against a post or other cooperating facing surface when one of the left or right turning end sections is cut off through a portion of said slotted connection perpendicular to the longitudinal axis of said one end section;

wherein said means for receiving an embedded fastener may be used to fasten the mitered face of either one of said left or right turning end sections to an uprising handrail while the other of said left or right turning end sections is adapted to be secured to a post or other cooperating facing surface by cutting off said other end section through a portion of said slotted connection means and using the slotted connection means and a bolt like connector whereby the same angled handrail fitting may be used to complete a left or right turn and said complimentary cap portion may be used to hide all fastening and connection means from view.

2. The angled handrail fitting of claim 1 wherein said slotted connection means comprise T shaped intersecting slots with a transverse head portion and a longitudinal stem portion.

3. The angled handrail fitting of claim 2 wherein said transverse head portion of the T shaped slot is deeper than the stem portion and forms bolting surfaces at the intersection of the head and stem against which a large diameter portion of a bolt like fastener can be tightened for making a connection when one of said left or right turning end sections is cut off to expose the stem of the T shaped slot.

4. The angled handrail fitting of claim 3 wherein said means for receiving an embedded fastener comprises a centric countersunk fastener opening in the lower body portion extending through and generally normal to said mitered terminating face.

5. The angled handrail fitting of claim 1 wherein at least one of said left or right turning end sections has a plurality of interconnected slotted connection means aligned along the longitudinal axis and arranged so that the mitered face of said one end section can be cut off at a plurality of locations to expose any one of said plurality of interconnected slotted connection means for use with a bolt like connector to make a connection with a cooperating facing surface to provide a choice of arm section lengths without additional hand working.

6. The angled handrail fitting of claim 5 wherein said plurality of slotted interconnection means comprise T shaped intersecting slots having a transverse head portion and a longitudinal stem portion, the head portion of one slot opening into the stem portion of the next slot.

7. The angled handrail fitting of claim 6 wherein said transverse head portion of the intersecting T shaped slots is deeper than the stem portions and forms bolting surfaces at the intersection of the head and stem against which a large diameter portion of a bolt like fastener can be tightened for making a connection when one of said left or right turning end sections is cut off to expose the stem of a T shaped slot.

8. The angled handrail fitting of claim 5 wherein said means for receiving an embedded fastener comprises a centric countersunk fastener opening in the lower body portion extending through and generally normal to said mitered terminating face.

9. A prefabricated universal fitting for interconnecting tangently with a length of handrail having a range of different inclination corresponding to varying stairway pitch angles and carrying the curve smoothly into an upright uprising which may be connected to a continuation of the handrail; the universal fitting comprising:

a length of shaped handrail fitting having a central longitudinal axis along its cross section and when viewed from the side in operative position a lower curved end section having a lower end face and an upper straight section, the shaped handrail having a top side and an underside; the curved section being curved along an arc of sufficient length to provide a tangent connection to a handrail for a range of handrail inclination when the curved portion of said fitting is transversely cut to expose a connecting face;

said lower curved end section having a plurality of interconnected slotted connection means aligned along said longitudinal axis for making a connection to an inclined handrail so that said lower curved end section may be cut off to form a connecting face to make a tangential connection with an inclined handrail to expose one of said slotted connection means for use with a bolt like fastener extending from an inclined handrail to make a connection therebetween without the necessity for hand working.

10. The prefabricated universal fitting of claim 9 wherein the underside of said fitting is grooved to accept one or more complementary filets to inconspicuously cover said interconnected slotted connection means and any bolt like fasteners employed therein.

11. The prefabricated universal fitting of claim 9 wherein the upper straight section terminates in a mitered end face, mitered for making an angled connection with a shaped handrail extension which may be connected thereto to form a continuation of the handrail profile.

12. The prefabricated universal fitting of claim 11 wherein the mitered end face of the upper straight section is predrilled with a centrally located opening normal to said mitered end face for accepting a bolt like fastener to be used in connecting a shaped handrail extension.

13. The prefabricated universal fitting of claim 12 wherein the underside of the upper straight section contains a plurality of centrally located predrilled openings spaced apart along said longitudinal axis, said spaced apart predrilled openings being angled normal to the mitered end face of the upper straight section wherein the upper straight section is adjustable to accommodate a variety of uprising distances by making a transverse cut parallel to said mitered end face at a plurality of longitudinal locations along said straight section to expose any one of said plurality of predrilled openings for use in making a connection with a shaped handrail extension by passing a bolt like fastener through an opening in a shaped handrail extension into a selected one of said plurality of predrilled openings passing through a transverse cut in said upper straight section.

14. The prefabricated universal fitting of claim 13 wherein the undersurface of the upper straight section is grooved to accept a filet which inconspicuously covers all of the predrilled openings in the underside.

15. The combination of the prefabricated universal fitting of claim 14 further including a shaped handrail extension for connection at a transverse cut to the upper straight section, said shaped handrail extension having a lower body portion and a removable complementary cap portion which fit together along a longitudinal surface and together form a mitered end; said shaped handrail extension having a transverse opposite end with said lower body portion having a T shaped slot spaced inwardly from the transverse end for receiving a bolt like fastener for connecting said transverse end to a post or other complementary facing surface; said lower body portion having a centrically located countersunk fastener opening angled to pass normal to the mitered end of the shaped handrail extension for connecting said extension to a selected one of said plurality of predrilled openings at a transverse mitered cut in said upper straight section whereby said prefabricated universal fitting can be adjustingly continued by means of said shaped handrail extension to be secured by attachment of said transverse end to a post or other cooperating facing surface wherein the fasteners in said shaped handrail extension are hidden when the complementary cap portion is replaced after the fasteners in the handrail extension are secured.

16. The combination of the prefabricated universal fitting of claim 14 further including an angled shaped handrail extension fitting which permits working from the upper side for use alternately when horizontally oriented as a left turning or right turning connection between the upper straight section of said universal fitting and a post or other cooperating facing surface, said angled fitting having an arcuate mid-section with end sections extending away from said mid-section each terminating at a mitered facing surface, said angled handrail fitting extension being separable into a lower body portion and a complementary cap portion; the other end portion of the lower body portion of the left and right turning end sections having means for receiving an embedded fastener passing through said mitered facing surfaces; a slotted connection means in each end section located inwardly from the innermost edge of the mitered face of each end section for receiving a bolt like connector for connecting against a post or other cooperating facing surface when one of the left or right turning end sections is cut off through a portion of said slotted connection; wherein said means for receiving an embedded fastener may be used to fasten the mitered face of either one of said left or right turning end sections to a selected one of said plurality of predrilled openings at a transverse mitered cut in said upper straight section whereby said fabricated universal fitting can be adjustably continued by means of said angled shaped handrail extension to complete either a left or right turn and the transversely cut off other of said left or right end sections can be abuttingly connected by means of said slotted connection means to a post or other operating facing surface and said complementary cap portion may be used to hide all fastening and connection means in said angled shaped handrail extension from view.

17. The prefabricated universal fitting of claim 14 wherein said plurality of slotted interconnection means comprise T shaped intersecting slots having a transverse head portion and a longitudinal stem portion, the head portion of one slot opening into the stem portion of the next slot.

18. The prefabricated universal fitting of claim 17 wherein said lower curved end section is curved along a radius arc and the head portion of each T shaped slot is angled from a radial orientation to form a bolting surface parallel to the radial orientation of a transverse cut off end face at the end of the stem of said T shaped slots.

19. The prefabricated universal fitting of claim 17 wherein said transverse head portion of the intersecting T shaped slots is deeper than the stem portions and forms bolting surfaces at the intersection of the head and stem against which a large diameter portion of a bolt like fastener can be tightened for making a connection when said lower curved end section is transversely cut off to expose the stem portion of a T shaped slot.

20. A prefabricated transition fitting for interconnecting a finishing element having a shaped handrail end with a variously inclined handrail within the customary range of stairway pitch angles, the transition fitting comprising:

a length of shaped handrail fitting having opposite first and second end faces and a longitudinal axis of symmetry, said handrail having an upper handrail body portion and an underside surface cut away along its length to form a channel like opening and at least one cover member to close said opening; said length of handrail fitting being curved along its length along an arc of sufficient length to provide a tangent connection at one of said ends to an inclined handrail over a range of handrail inclinations when said handrail fitting is transversely cut off to expose a connecting face and the fitting is oriented with the opposite end face abutting the handrail end of a finishing element to smoothly continue the handrail from the finishing element into the transition fitting;

said channel like undersurface of the transition fitting having a plurality of interconnected slotted connection means aligned along said longitudinal axis for making a connection at one of said first or second fitting end faces to the handrail end of a finishing element with the aid of a bolt like fastener and said other of said first or second fitting end faces may be cut off at a selected location to form a connecting face to make a tangential connection with an inclined handrail by exposing one of said slotted connection means for use with a bolt like fastener extending into an inclined handrail to make a connection therebetween without the necessity for hand working, the cover member being replaced on said fitting to hide all connection means and fasteners from view.

21. The prefabricated transition fitting of claim 20 wherein said finishing element is a volute or turnout.

22. The prefabricated transition fitting of claim 20 wherein said plurality of slotted interconnection means comprise T shaped intersecting slots having a transverse head portion and a longitudinal stem portion, the head portion of one slot opening into the stem portion of the next slot.

23. The prefabricated transition fitting of claim 22 wherein said transverse head portion of the intersecting T shaped slots is deeper than the stem portions and forms bolting surfaces at the intersection of the head and stem against which a large diameter portion of a bolt like fastener can be tightened for making a connection when one of the first and second end faces of the transition fitting is cut off to expose the stem of a T shaped slot.

24. The prefabricated transition fitting of claim 22 wherein said curved transition fitting is curved along a radius arc and the head portion of each T shaped slot is angled from a radial orientation to form a bolting surface parallel to the radial orientation of a transverse cut off end face at the end of the stem of said T shaped slots.

25. The prefabricated transition fitting of claim 20 wherein said channel like undersurface of the transition fitting is sized to closely fit the width of the cutoff end of a square ended baluster and said cover member can be cut to cover said channel like undersurface, said cover member having its ends mitered to neatly conform to opposite side surfaces of the end of said square ended baluster.

26. An improved prefabricated handrail extension fitting which permits working from the upper side to secure the fitting to a post or other cooperating facing surface without hand working or detracting from appearance, comprising:
   a length of shaped handrail fitting having a longitudinal axis and transverse first end having a face to be connected to a cooperating facing surface to form a butt joint, and an opposite second end having an angled transverse face to be connected to a cooperating facing surface to form an angled joint;
   said fitting having a lower body portion and a removable complementary cap portion which fit together along a longitudinal surface having unobtrusive seams running with the grain;
   said lower body portion having a transverse slot spaced from the face of the first end and deep enough to receive the headed end of a bolt-like fastener below the complementary cap and a centric countersunk fastener opening at said second end to receive a fastener extending from a cooperating facing surface of another handrail part;
   said lower body portion further having a bolt-receiving longitudinal groove intersecting said transverse slot and connecting with the central portion of said first face so that said groove will receive the body portion of a bolt when the headed end is received in said transverse slot, said groove being narrower than said slot to provide bolting surfaces on either side of said groove at the intersection of said groove and said slot;
   whereby the fitting can be secured to a post or other cooperating facing surface having an extending bolt by placing the lower body portion in position with the extending bolt received in the groove and slot and working a headed portion tight against said bolting surfaces, said groove and slot being hidden when said complementary cap portion is replaced.

27. The fitting of claim 26 wherein said angled face is angled at forty five degrees from the longitudinal axis of the fitting to form a connection between the fitting and an uprising handrail section at right angles thereto.

28. An improved prefabricated handrail extension fitting which permits working from the upper side to secure the fitting to a post or other cooperating facing surface without hand working or detracting from appearance, comprising:
   a length of shaped handrail fitting having a longitudinal axis and transverse first end having a face to be connected to a cooperating facing surface to form a butt joint;
   said fitting having a lower body portion and a removable complementary cap portion which fit together along a longitudinal surface having unobtrusive seams running with the grain;
   said lower body portion having a plurality of transverse slots spaced at intervals along the longitudinal axis from the face of the first end of the fitting and a bolt-receiving longitudinal groove intersecting each of said transverse slots and forming bolting surfaces at the intersection of the longitudinal groove and each transverse slot, said groove being sized and spaced to receive the body portion of a bolt when a headed portion of the bolt is received in a selected one of said transverse slots, said groove being narrower than said slots to provide said bolting surfaces on either side of the groove at the intersections of said groove and said slots;
   wherein said handrail fitting can be cut off at a plurality of locations along its length to utilize one of the bolting surfaces of a given transverse slot to secure the fitting to a post or other cooperating facing surface and provide a range of adjustment in length of the fitting without additional hand working when a bolt extending from a cooperating facing surface is received in the groove and a selected slot and the headed portion of the bolt worked tight against said bolting surfaces of said selected slot, said groove and any remaining slots being hidden when said complementary cap portion is replaced.

29. The fitting of claim 28 further including a second end having an angled transverse face to be connected to a cooperating facing surface to form an angled joint wherein said lower body portion includes a centric countersunk fastener opening to receive a fastener extending through to a cooperating facing surface of another handrail part.

30. The fitting of claim 29 wherein said angled face is angled at forty five degrees from the longitudinal axis of the fitting to form a connection between the fitting and an uprising handrail section at right angles thereto.

31. The fitting of claim 29 wherein said transverse slot is deeper than said groove, said groove being located to receive and support the body portion of a bolt like fastener generally centrally with respect to said transverse end face.

* * * * *

UNITED STATES PATENT AND TRADEMARK OFFICE
CERTIFICATE OF CORRECTION

PATENT NO. : 5,261,201
DATED : November 16, 1993
INVENTOR(S) : Lynn H. Smith

It is certified that error appears in the above-indentified patent and that said Letters Patent is hereby corrected as shown below:

In column 16, line 29, delete "14" and add --9--.

In column 17, line 36, delete "22" and add --20--.

Signed and Sealed this

Nineteenth Day of April, 1994

Attest:

BRUCE LEHMAN

Attesting Officer

Commissioner of Patents and Trademarks